US006762413B2

United States Patent
Zeng

(10) Patent No.: US 6,762,413 B2
(45) Date of Patent: Jul. 13, 2004

(54) CORRECTION FOR DEPTH-DEPENDENT SENSITIVITY IN ROTATING SLAT-COLLIMATED GAMMA CAMERA

(75) Inventor: Gengsheng Lawrence Zeng, Salt Lake City, UT (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 12 days.

(21) Appl. No.: 10/305,591

(22) Filed: Nov. 27, 2002

(65) Prior Publication Data

US 2003/0111609 A1 Jun. 19, 2003

Related U.S. Application Data

(63) Continuation-in-part of application No. 09/708,960, filed on Nov. 8, 2000, now Pat. No. 6,603,123.

(51) Int. Cl.[7] .............................................. G01T 1/166

(52) U.S. Cl. ............................... 250/363.1; 250/363.04

(58) Field of Search .......................... 250/363.1, 363.04; 378/147

(56) References Cited

U.S. PATENT DOCUMENTS 4,563,583 A * 1/1986 Hattori .................... 250/363.1

* cited by examiner

Primary Examiner—Constantine Hannaher
Assistant Examiner—Shun Lee
(74) Attorney, Agent, or Firm—Fay, Sharpe, Fagan, Minnich & McKee, LLP

(57) ABSTRACT

A rotating laminar emission camera includes a detector (22) which detects radiation. The detector (22) has a radiation receiving side (23) that faces an object (e.g., a patient 200) being studied. The detector (22) includes an array of detection elements (106), the array extending in a first direction across the radiation receiving side (23) of the detector (22). The detection elements (106) each individually detect radiation incident thereon. A collimator (100) constructed of a radiation attenuative material is arranged on the radiation receiving side (23) of the detector (22). The collimator (100) experiences relative rotation about an axis (109) substantially normal to the radiation receiving side (23) of the detector (22). The relative rotation is relative to the object being studied. The collimator (100) includes a plurality of spaced apart slats (102) each extending in a second direction across the radiation receiving side (23) of the detector (22). The slats (102) are spaced apart from one another such that a plurality of the detector elements (106) in the array thereof are arranged between adjacent pairs of slats (102).

21 Claims, 8 Drawing Sheets

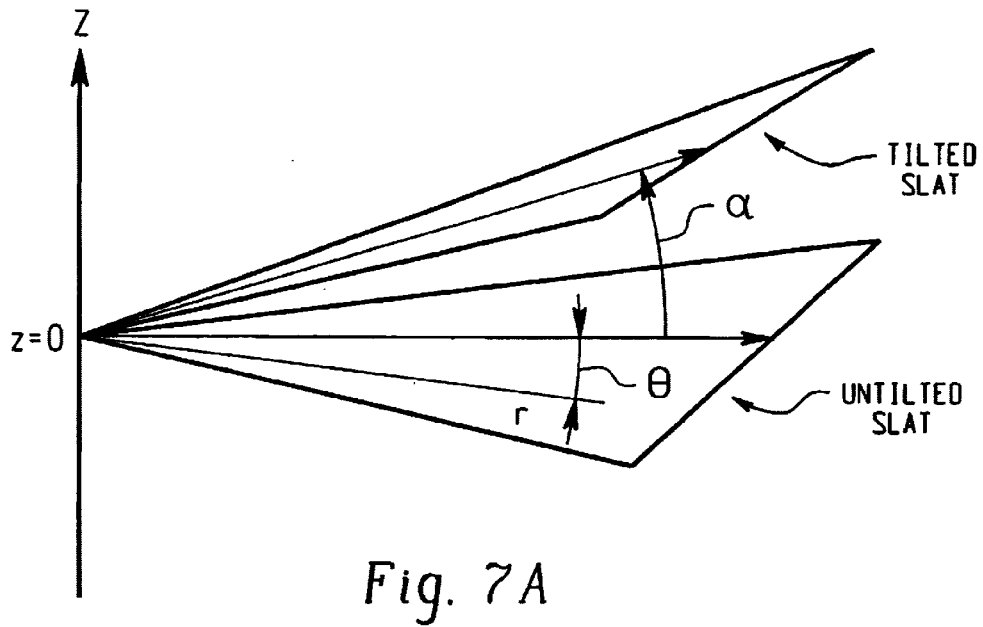
Fig. 7A
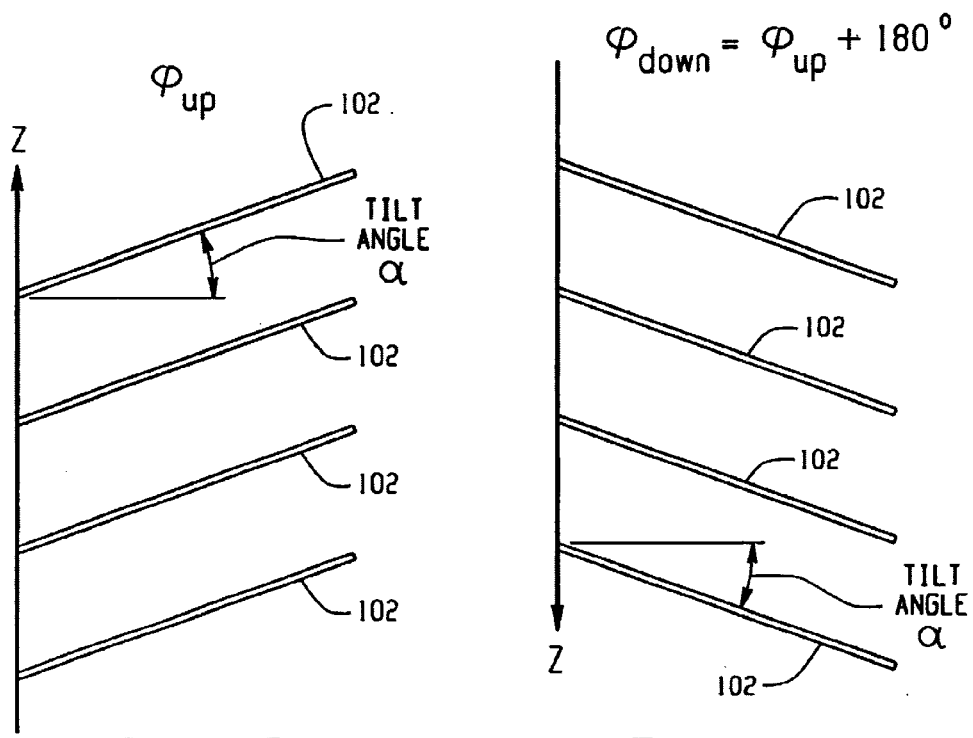
Fig. 7B
Fig. 7C

CORRECTION FOR DEPTH-DEPENDENT SENSITIVITY IN ROTATING SLAT-COLLIMATED GAMMA CAMERA

This application is a continuation-in-part of U.S. patent application Ser. No. 09/708,960, filed Nov. 8, 2000, U.S. Pat. No. 6,603,123.

BACKGROUND

The present invention relates to the art of nuclear medical imaging. It finds particular application in conjunction with rotating one-dimensional (ID) slat-collimated gamma cameras and single photon emission computed tomography (SPECT), and will be described with particular reference thereto. However, it is to be appreciated that the present invention is also amenable to other like applications and other diagnostic imaging modes such as, e.g., positron emission tomography (PET).

In diagnostic nuclear imaging, one or more radiation detectors are mounted on a movable gantry to view an examination region which receives a subject therein. Typically, one or more radiopharmaceuticals or radioisotopes such as $^{99m}$Tc or $^{18}$F-Fluorodeoxyglucose (FDG) capable of generating emission radiation are introduced into the subject. The radioisotope preferably travels to an organ of interest whose image is to be produced. The detectors scan the subject along a selected path or scanning trajectory and radiation events are detected on each detector.

In a traditional scintillation detector, the detector includes a scintillation crystal that is viewed by an array of photomultiplier tubes. A collimator which includes a grid- or honeycomb-like array of radiation absorbent material is located between the scintillation crystal and limits the angle of acceptance of radiation which will be received by the scintillation crystal. The relative outputs of the photomultiplier tubes are processed and corrected to generate an output signal indicative of the position and energy of the detected radiation. The radiation data is then reconstructed into an image representation of a region of interest.

A so-called rotating laminar emission camera ("ROLEC"), also know as the rotating laminar radionuclide camera, has been disclosed in the literature and prior art. Devices utilizing a cadmium telluride (CdTe) detector arrangement have been disclosed in Mauderli, et al., *A Computerized Rotating Laminar Radionuclide Camera*, J. Nucl. Med 20: 341–344 (1979) and Entine, et al., *Cadmium Telluride Gamma Camera*, IEEE Transactions on Nuclear Science, Vol. NS-26, No.1: 552–558 (1979). According to one version, the device included a linear array of CdTe detectors separated by tungsten plates. The plates were arranged perpendicular to the detector faces and confined the field of view of each detector to one dimension. The device had a square (approximately 4 cm×4 cm) active area, although a circular lead mask reduced the active area to 13.2 cm$^2$. The detectors, which had platinum-film electrodes, were attached to copper strips on a printed circuit board that also served as the base of the collimator and as a support for amplifier-discriminator circuits.

A ROLEC having a 250 mm×250 mm active area was disclosed in U.S. Pat. No. 4,090,080 to Tosswill, issued May 16, 1978, incorporated by reference herein, in its entirety. The device included scintillating plastic sheets disposed between parallel collimator plates supported by a steel frame in a perpendicular orientation with respect to the radiation receiving face of the detector. Fiber optics epoxied to the rear surface of each scintillating sheet transferred light generated in the each of the detectors to a corresponding photomultiplier. According to Tosswill, the ROLEC may be operated moving its axis along another curved or other configuration or without rotation, with symmetry preferred but not essential.

Devices using a segmented germanium crystal have been described by Urie, et al., *Rotating Laminar Emission Camera with GE-detector*, Med. Phys. 8(6): 865–870 (1981); Mauderli, et al., *Rotating Laminar Emission Camera with GE-Detector: An Analysis*, Med. Phys. 8(6): 871–876 (1981); Malm, et al., *A Germanium Laminar Emission Camera*, IEEE Transactions on Nuclear Science, Vol. NS-29, No. 1: 465–468 (1982); and Mauderli, et al., *Rotating Laminar Emission Camera with GE-detector: Further Developments*, Med. Phys. 14(6): 1027–1031 (1987).

In a first version, a 11.5 mm thick, 45 mm×45 mm segmented germanium detector was placed behind parallel tungsten plates oriented perpendicular to the face of the detector. The crystal was segmented to form a plurality of channels, with the plates aligned with the segmentations. A 4.5 cm diameter viewing aperture was located between the detector and the activity source. Projection data acquired at multiple angular orientations as the detector-collimator assembly was rotated about its center was mathematically reconstructed to form a two-dimensional (2D) image of the activity distribution.

A second version simulated a 195 mm×195 mm detection area using five germanium blocks having a total length of 250 mm segmented into distinct electrical channels. The detector was translated linearly in a direction perpendicular to the plane of the plates to simulate a full-size detector.

While maintaining certain advantages, such as a better sensitivity-resolution compromise, over, e.g., traditional Anger cameras, the previously developed ROLECs are burdened by some other undesirable limitations. For example, the type of one dimensional collimation or slat geometry used by ROLECs presents issues with the image reconstruction. In particular, the ROLEC geometry results in a plane integral reconstruction problem as opposed to the line integral reconstruction problem that is generally encountered in traditional Anger camera applications. Moreover, the geometry produces a plane integral only in a first approximation.

In actuality, the plane integral should have a weighting factor introduced thereto to account for the fact that a detector's sensitivity has a 1/r dependence to an object being imaged, where r represents the distance of a radiation event under consideration to the detector. That is to say, the detector is generally more sensitive to relatively close objects and less sensitive to far away objects. Previously developed ROLECs merely disregard or ignore the 1/r weighting factor in solving the reconstruction problem. In previously developed ROLECs, the first approximation is merely accepted, i.e., it is accepted that the geometry produces plane integrals without 1/r weighting. Ultimately, failure to model this 1/r weighting factor or dependence, or improperly modeling the same, reduces the quality of images produced.

Additionally, while ROLECs have the advantage of relatively higher efficiency and spatial resolution, they have been expensive to produce inasmuch as significant quantities of relatively expensive detector material have been required. Although detector material cost can be reduced by using a number of relatively smaller detector segments, such an approach complicates the manufacturing process and requires that variations in the response of the individual segments be considered. Still another drawback is that the collimator slat length has been equal to the detector field of view. This undesirably results in: additional detector, collimator, and structural materials being used; introduction of spurious counts which do not contribute to useful image information; and, additional mass and bulk being incorporated into a rotating structure.

The issues raised in the foregoing paragraph have been addressed, at least in part, by developing a ROLEC which utilizes a detector area which is small compared to the length of the collimator slats. See, e.g., commonly owned U.S. patent application Ser. No. 09/206,508 of Gagnon, et al., filed Dec. 7, 1998, incorporated by reference herein, in its entirety. However, when the detector area is small compared to the length of the collimator slats, the 1/r weighting issue is exacerbated.

The present invention contemplates a new and improved ROLEC and reconstruction technique therefor which overcomes the above-referenced problems and others.

SUMMARY

In accordance with one aspect of the present invention, a rotating laminar emission camera includes a detector which detects radiation. The detector has a radiation receiving side that faces an object (e.g., a patient) being studied. The detector includes an array of detection elements, the array extending in a first direction across the radiation receiving side of the detector. The detection elements each individually detect radiation incident thereon. A collimator constructed of a radiation attenuative material is arranged on the radiation receiving side of the detector. The collimator experiences relative rotation about an axis substantially normal to the radiation receiving side of the detector. The relative rotation is relative to the object being studied. The collimator includes a plurality of spaced apart slats each extending in a second direction across the radiation receiving side of the detector. The slats are spaced apart from one another such that a plurality of the detector elements in the array thereof are arranged between adjacent pairs of slats.

In accordance with another aspect of the present invention, a nuclear medical imaging apparatus includes: a receiving region wherein an object being imaged is received; a radiation detector having an array of detector elements on a side which faces the receiving region, the side having an axis which is substantially normal thereto; a collimator fabricated from radiation attenuative material arranged on the detector between the detector and the receiving region, the collimator including a plurality of slats that have a spacing from one another such that in the direction of the spacing a plurality of detector elements are positioned between adjacent pairs of slats; and, a drive which imparts about the axis relative rotation between the collimator and the object being imaged.

In accordance with another aspect of the present invention, a method of nuclear medical imaging includes: exposing a detector including an array of radiation detecting elements to an object being imaged; restricting radiation acceptance for the detector such that different fields-of-view are established for elements in the array; obtaining a first data set based on radiation detected via a first set of elements in the array; obtaining a second data set based on radiation detected via a second set of elements in the array; and, subtracting the second data set from the first data set to determine a difference between the first and second data sets.

In accordance with another aspect of the present invention, a nuclear medical imaging apparatus includes: means for exposing a detector including an array of radiation detecting elements to an object being imaged; means for restricting radiation acceptance for the detector such that different fields of view are established for elements in the array; means for obtaining a first data set based on radiation detected via a first set of elements in the array; means for obtaining a second data set based on radiation detected via a second set of elements in the array; and, means for subtracting the second data set from the first data set to determine a difference between the first and second data sets.

One advantage of the present invention is high image quality resulting from proper modeling of the measured radiation data.

Another advantage of the present invention is an improved resolution-sensitivity compromise compared to traditional Anger cameras.

Still further advantages and benefits of the present invention will become apparent to those of ordinary skill in the art upon reading and understanding the following detailed description of the preferred embodiments.

BRIEF DESCRIPTION OF THE DRAWING(S)

The invention may take form in various components and arrangements of components, and in various steps and arrangements of steps. The drawings are only for purposes of illustrating preferred embodiments and are not to be construed as limiting the invention. The drawings are not to scale.

FIG. 7A is a diagrammatic illustration depicting an exemplary reconstruction coordinate system in accordance with aspects of the present invention.

FIGS. 7B and 7C are diagrammatic illustrations depicting the tilt of collimator slats at 180 degree opposing spin angles of a radiation receiving face of a detector head in accordance with aspects of the present invention.

DETAILED DESCRIPTION

Figure 1:
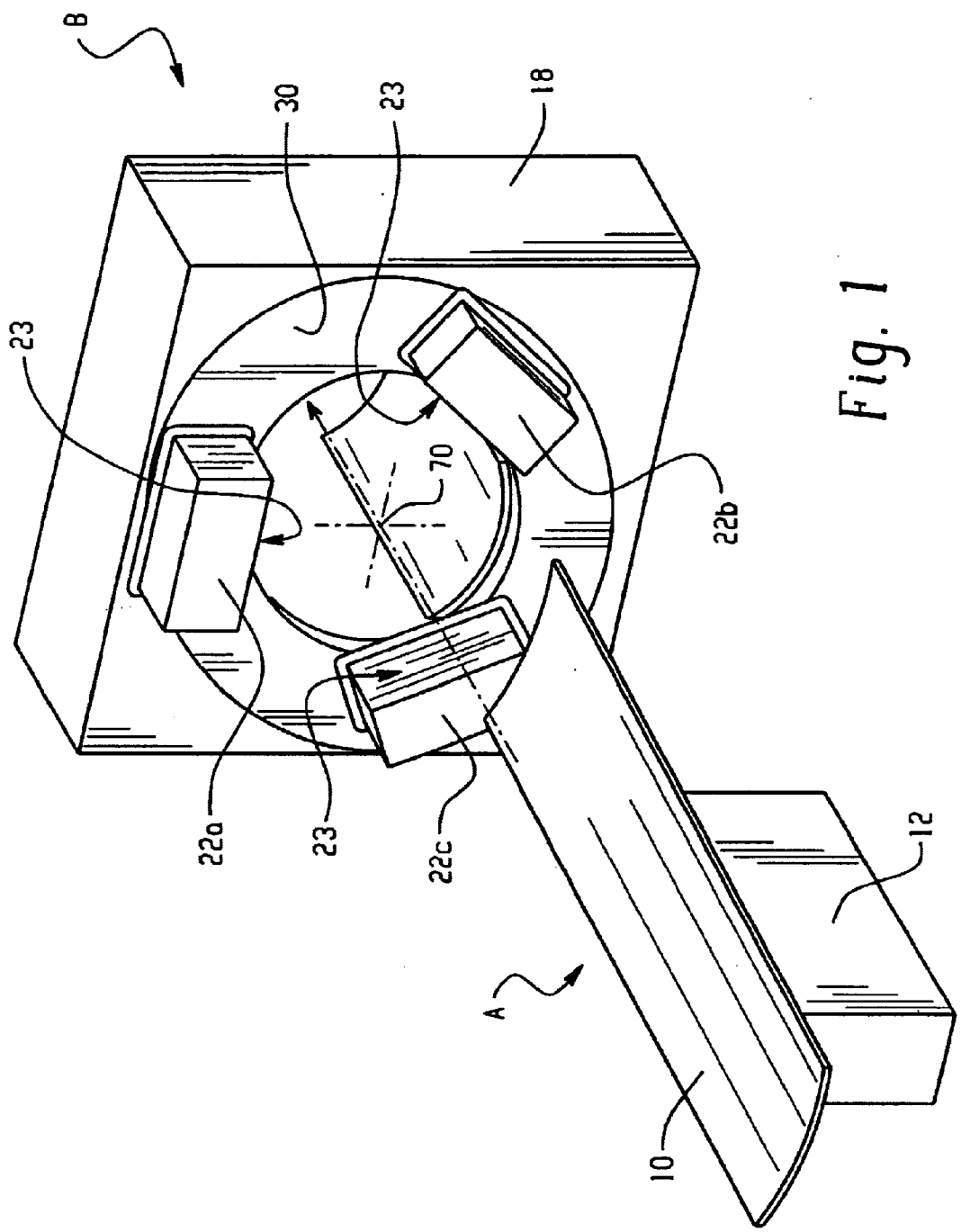
FIG. 1 is a diagrammatic illustration depicting an exemplary nuclear imaging apparatus in accordance with aspects of the present invention.

With reference to FIG. 1, an object being imaged or studied, such as a patient, is supported on a couch or support A. Preferably, one or more radiopharmaceuticals or radioisotopes capable of generating emission radiation have been introduced into the object. The support A preferably includes a thin, relatively radiation transmissive support surface 10 which is mounted cantilevered from a base 12. The base 12 optionally includes motors (not shown) for raising and lowering the support surface 10 and for extending and retracting the support surface 10 in a longitudinal direction (i.e., parallel to axis 70) relative to a nuclear camera gantry B. Alternately, relative longitudinal motion may be achieved by moving the gantry B in the longitudinal direction.

The gantry B includes stationary and rotating gantry portions 18 and 30, respectively. Detector heads 22a, 22b and 22c are mounted to the rotating gantry portion 30 that defines a receiving region or aperture into which the object being studied or anatomy of interest may be inserted. Each detector head 22 preferably includes: a radiation receiving side or face 23 that faces the object in the receiving region; and a housing about the other detector head faces that is fabricated from a radiation attenuative material, such as lead, for example. The detector heads 22 are adjustably mounted to the rotating gantry 30 which rotates about the central axis 70 extending longitudinally through the receiving region or aperture. The detector heads 22 are preferably adjustable radially toward and away from the aperture, and tangentially with respect to the aperture. The relative angular positions of the detectors 22 about the aperture may also be adjusted or varied. As the gantry 30 rotates about the axis 70, the rotating detector heads 22 define a generally circular trajectory, the precise shape of which may vary as the detector heads 22 are adjusted radially or tangentially during rotation of the gantry 30. In operation, the detector heads 22 are preferably rotated or indexed around the object to monitor radiation from a plurality of directions to obtain a plurality of different angular views. As is known in the art, radiation data is collected as the detector heads 22 are rotated about the aperture. The data represents radiation incident on the radiation receiving face 23 of each detector head 22 having various angular views of the object which change as the rotating gantry 30 rotates. Ultimately, the data is used to generate an image indicative of the detected radiation from the radiopharmaceuticals or radioisotopes introduced into the object.

While described above as having three detector heads 22, greater (e.g., 4 or more) or fewer (e.g., 1 or 2) numbers may be used. It is not necessary that the detector heads 22 be disposed at equal angular intervals about the aperture; a variety of different configurations may be implemented. It is also not necessary that the detector heads 22 be moved with respect to or rotated about the object; relative motion may be provided by moving the object with respect to the detector heads 22.

Those skilled in the art will recognize that the apparatus configuration shown in FIG. 1 is exemplary of a configuration which provides a number of degrees of freedom. Of course, other suitable detector head, support and gantry configurations may be implemented, provided that the desired relative motion (if any) between the detector head(s) and the object or between the detector heads themselves may be achieved.

Figure 2A:
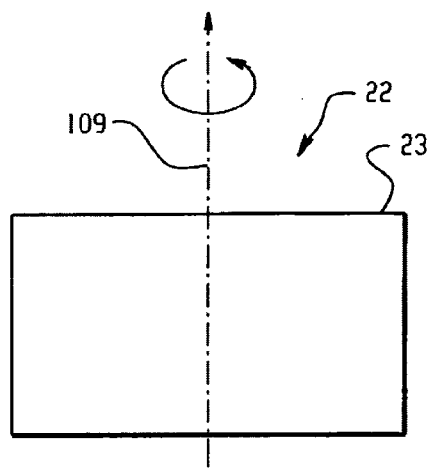
FIGS. 2A and 2B are diagrammatic illustrations depicting side views of alternative detectors heads in accordance with aspects of the present invention.
Figure 2B:
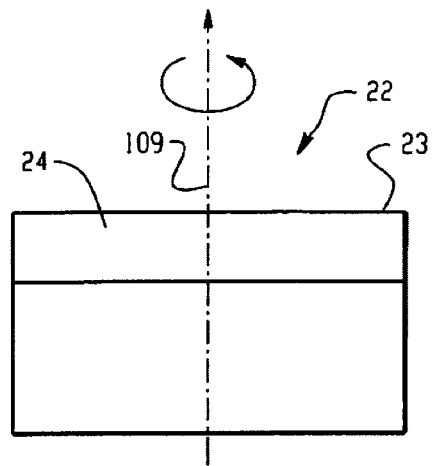

With further reference to FIGS. 2A and 2B, in a preferred embodiment, the radiation receiving side or face 23 of the detector head 22 rotates about a preferably central axis 109 which is oriented perpendicular to the radiation receiving side or face 23 of the detector head 22. Preferably, the entire detector head 22 rotates about the axis 109. Alternately, each detector head 22 includes a rotating detector portion 24 which rotates about the central axis 109. The rotating detector portion 24 is preferably on the side of the detector head 22 proximal to the object or receiving region so that the radiation receiving face 23 of the detector head 22 rotates about the axis 109. In any event, on the side of the detector head 22 that faces the object or receiving region, preferably one or more radiation detecting segments or elements 106a, 106b, . . . 106n (referred to generally or collectively simply by reference numeral 106) are arranged to rotate with the detector head 22 or the rotating portion 23 thereof.

Figure 3:
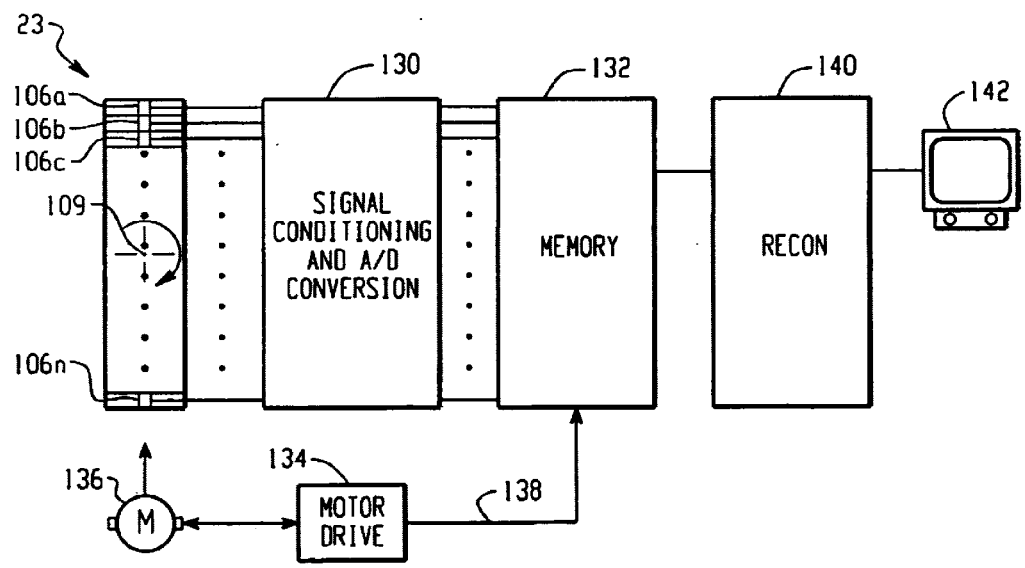
FIG. 3 is a diagrammatic illustration depicting the functional relationship between data conditioning and processing elements in accordance with aspects of the present invention and a detector head of the nuclear imaging apparatus of FIG. 1.

With further reference to FIG. 3, signals from the detector elements 106a, 106b, . . . 106n of each detector head 22 are preferably received by signal conditioning and analog to digital conversion circuitry 130 and stored in a memory 132. A motor drive 134 drives a motor 136 which causes the radiation receiving face 23 to rotate about the preferably central axis 109 perpendicular thereto. A signal 138 indicative of the rotational or angular position of the rotating radiation receiving face 23 is provided to the memory 132, and the data from the detector elements 106 is stored accordingly therein.

Alternately, the detector face 23 is rotated about the axis 109 continuously as radiation data is collected, or data is collected with the detector face 23 being rotatably located or indexed about the axis 109 at a plurality of discrete angular positions. In either case, accessing the memory 132, a reconstruction processor 140 reconstructs the data into image representations for display in human readable form on a display device 142 such as a monitor, film, or the like.

In a preferred embodiment, the data may be reconstructed by the reconstruction processor 140 using a two step process. First, the data received by the detector elements 106 at each of a plurality of positions about the axis 109 is reconstructed to create a two-dimensional data set analogous to the data generated by a conventional camera, e.g., an Anger camera. Second, the two dimensional data sets obtained at a plurality of positions about the axis 70 may in turn be reconstructed so as to create volumetric image data. Alternately, the data may be reconstructed using a single step process whereby the data received by the detector elements 106 at each of a plurality of positions about the axis 109 and the axis 70 are reconstructed directly to form the volumetric image data.

Figure 4:
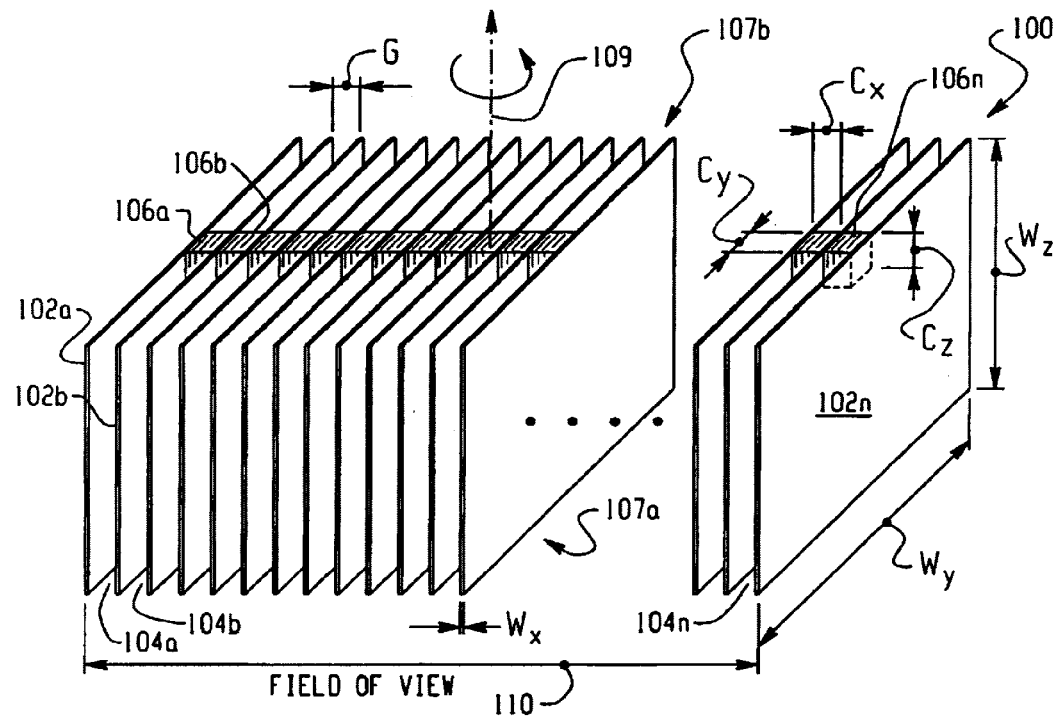
FIG. 4 is a diagrammatic illustration depicting a perspective view of a ID slat-collimator in accordance with aspects of the present invention.

With further reference to FIG. 4, interposed between the object and the detector head 22, a one dimensional (ID) slat collimator 100 is arranged on the rotating radiation receiving face 23 of each detector head 22. The collimator 100 preferably includes a plurality of generally rectangular shaped spaced apart septa or slats 102a, 102b, . . . 102n (referred to generally or collectively simply by reference numeral 102) which are constructed or fabricated from a radiation attenuative material. In a preferred embodiment, the slats 102 are fabricated from tungsten, although other materials providing suitable attenuation may be used.

Figure 5A:
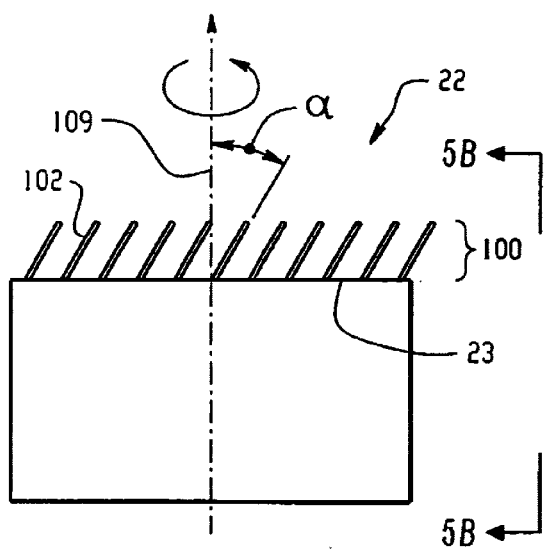
FIG. 5A is diagrammatic illustration of a side view of a detector head assembly including the 1D slat-collimator of FIG. 4 in accordance with aspects of the present invention.
Figure 5B:
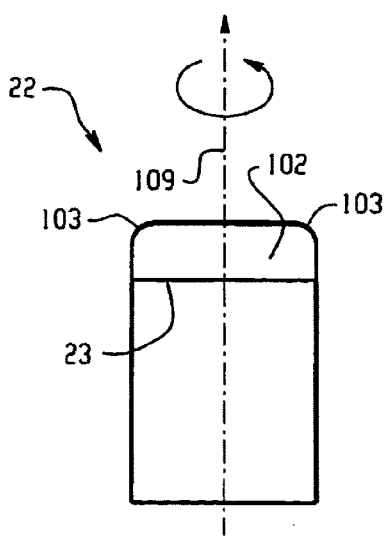
FIG. 5B is a diagrammatic illustration of an end view of the detector head assembly of FIG. 5A taken along section line 5B—5B.

In a preferred embodiment, the two opposing corners 103 of the slats 102 proximal the object or receiving region are rounded (best seen in FIG. 5B). The rounded corners 103 preferably have a radius of curvature approximately equal to the slats' height $W_z$, e.g., 5 cm. By smoothing out the corners in this manner, changes in resolution which are slat height and/or width dependant can also be smoothed out.

The spacing between the slats 102 defines a plurality of slits or gaps 104a, 104b, . . . . 104n (referred to generally or collectively simply by reference numeral 104) having a width G. Each septum has a height $W_z$ which is defined by a distance that the septum extends out from the face 23, a longitudinal or transverse dimension $W_y$ which is defined by the long dimension of the generally rectangular septum, and a thickness $W_x$ which is relatively small compared to G, $W_z$ and/or $W_y$. A front edge 107a of the slats 102 faces the receive region and a back edge 107b is proximal the radiation receiving face 23 of the detector head 22. Where the slats 102 are parallel to one another, the field of view 110 (FOV) in the direction transverse to the orientation of the slats 102 corresponds to the number of slats 102 multiplied by their spacing.

As illustrated in this embodiment, each radiation sensitive detector element 106a, 106b, . . . . 106n is disposed or arranged so as to detect radiation received in each of the respective gaps 104a, 104b, . . . 104n. Optionally, each of the detector segments or elements 106a, 106b, . . . 106n has a transverse dimension $C_y$, a thickness $C_x$, and a height $C_z$. The detector elements 106a, 106b, . . . 106n are preferably centered about the midpoint of the transverse dimension $W_y$ of the slats 102, although they may be offset therefrom. In one embodiment, the detector elements 106a, 106b, . . . 106n are fabricated from scintillating materials such as cesium iodide (CsI) or sodium iodide (NaI) in optical communication with a photo diode or other appropriate photodetector. A semiconductor detector material such as cadmium zinc telluride (CdZnTe) may also be used. Depending on the requirements of a particular application, other materials such as silicon (Si), germanium (Ge), cadmium telluride (CdTe), $HgI_2$, gallium arsenide (GaAs), bismuth sulphate ($Bi_2S_3$), $PbI_2$, GaSe, AlSb or CdSe may also be used.

In one preferred embodiment, the dimension $C_y$ is less than $W_y$. That is, the generally rectangular slats 102 extend in their long dimension $W_y$ beyond an outer dimension $C_y$ of the radiation receiving face 23. Alternately, the transverse dimension $C_y$ of the detector segments 106a, 106b, . . . 106n is substantially the same as the transverse dimension $W_y$ of the slats 102. Moreover, in another alternate embodiment, the plurality of detector segments 106a, 106b, . . . 106n are replaced by a single detector element which spans across all the collimator slats 102 or fewer detector elements which each span multiple collimator slats 102. In the case of a single detector element or of detector elements spanning multiple slats 102, the active areas of each element located in the gaps 104 between adjacent slats 102 are separately sampled when collecting or acquiring the radiation data.

As best seen in FIG. 5A, the slats 102 are tilted at an angle a greater than zero with respect to the axis 109. While the slats 102 are parallel to one another as shown, they also optionally have a progressively changing degree of tilt (i.e., a so called fan beam configuration). The angle a is optionally adjustable. In a preferred embodiment, the angle a is chosen to be inversely proportional to the camera's resolution or a desired imaging resolution. Preferably, the angle a is greater than zero degrees and less than or equal to 5 degrees. More preferably, the angle a is equal to approximately 0.25 degrees. By tilting the slats 102 in this manner, the 1/r weighting factor or dependence discussed in the background above can be accounted for in the reconstruction as discussed below. In particular, the 1/r weighting factor, while initially modeled in the reconstruction solution, is caused to fall out through cancellation.

Figure 6:
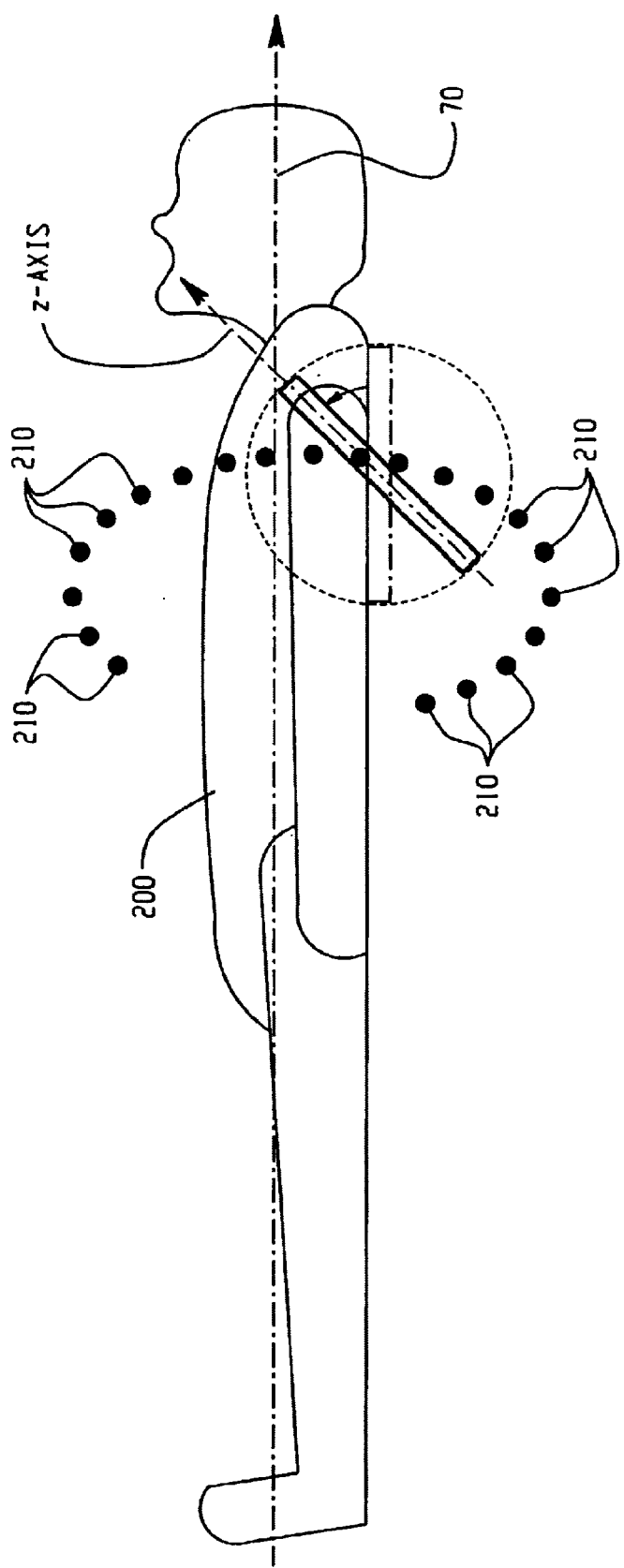
FIG. 6 is a diagrammatic illustration of data acquisition using the nuclear imaging apparatus of FIG. 1 in accordance with aspects of the present invention.

An exemplary data acquisition for a three-dimensional (3D) tomographic image reconstruction is now discussed with further reference to FIG. 6. In a preferred embodiment, the relative motion of the radiation receiving face 23 of each detector head 22 is decomposed into two parts. Part one of the decomposed motion is achieved via rotation of the rotating gantry 30 such that the centroid of each detector is rotated or indexed about the axis 70 and hence the object, represented here by a patient 200. A plurality of exemplary angular centroid positions are indicated by reference numeral 210. At each centroid position 210, a "SPECT-view" of the patient 200 is obtained. Each SPECT-view can be defined by the relative angular centroid position 210 about the axis 70, nominally termed the SPECT-angle. Preferably, for 3D image reconstruction 180 degrees of SPECT-views are collected or acquired.

For part two of the decomposed motion, at each SPECT-angle, the radiation receiving face 23 of the detector head 22 is rotated or indexed about its central perpendicular axis 109 via motor 136. Preferably, the face 23 is rotated 360 degrees to generate what is known in the art as a sinogram. The sinogram is the measured projection data arranged in a matrix where the horizontal axis represents the linear position of the projection data along the direction of the FOV 110, and the vertical axis represents a spin angle n of the face 23 about the axis 109. At each spin angle n, the data generated is a one-dimensional vector of 1/r weighted plane integral values.

The reconstruction processor 140 then carries out an appropriate image reconstruction using a modified Radon transformation. A traditional Radon transformation, as is known in the art, takes the second order derivative of the measured data one-dimensionally, then backprojects the processed data three-dimensionally. At each SPECT-view, the modified Radon transformation employed herein uses as an approximation for the first derivative, the difference between sinogram data obtained at spin angles n displaced 180 degrees apart. The second derivative is evaluated by taking the derivative of the forgoing difference. The second derivative can then be backprojected to obtain the 3D image reconstruction.

More specifically, with further reference to FIG. 7A, the mathematical support for image reconstruction in accordance with aspects of the present invention is now discussed. For exemplary purposes herein, the object being imaged is expressed in a cylindrical coordinate system as the function $f(r, \theta, z)$, where the z-axis is a central axis on the detector's radiation receiving face 23 running in the direction of the FOV 110. Without loss of generality, one detection cell (e.g., one radiation detecting element 106) at z=0 is considered. Nevertheless, the support holds for detection cells at other z locations using their respective α, which may be different from slat to slat or essentially the same for all the slats. In any event, the mathematical support is merely offered for purposes of explaining herein how the 1/r dependence falls out.

At a first spin angle $n_{up}$ where the slats are tilted nominally "up" by an angle α with respect to the axis 109 (see FIG. 7B), the measured 1/r weighted planar integral is given by:

$$g_{up} = \int\int \frac{1}{r} f(r, \theta, r\tan(\alpha)) r\, dr\, d\theta. \quad (1)$$

At second spin angle $n_{down}$ displaced from $n_{up}$ by 180 degrees, the slats 102 are tilted by a with respect to the axis 109 in exactly the opposite direction (i.e., nominally "down") relative to their tilt at the first spin angle (see FIG. 7C), and the measured 1/r weighted planar integral is given by:

$$g_{down} = \int\int \frac{1}{r} f(r, \theta, -r\tan(\alpha)) r\, dr\, d\theta. \quad (2)$$

Evaluating the difference between the two measurements represented by equations (1) and (2) gives:

$$g_{up} - g_{down} = \quad (3)$$
$$2\tan(\alpha) \int\int \frac{f(r, \theta, r\tan(\alpha)) - f(r, \theta, -r\tan(\alpha))}{2(r\tan(\alpha))} r\, dr\, d\theta.$$

Thus, if $\alpha$ is sufficiently small, equation (3) can be approximated by or rewritten as:

$$g_{up} - g_{down} = 2\tan(\alpha) \int\int f_z'(r,\theta,0) r\, dr\, d\theta \quad (4);$$

or equivalently, in an x, y, z Cartesian coordinate system, equation (4) is given by:

$$g(z) = g_{up}(z) - g_{down}(z) = 2\tan(\alpha) \int\int f_z'(x, y, 0)\, dx\, dy \quad (5)$$

In this manner, while originally modeled and/or accounted for in the measurements, the 1/r weighting factor has been eliminated or canceled out, and the resulting function g(z) is the derivative of the regular planar integral.

It is to be understood that the tilt angle a should be large enough that the sinogram measurements obtained at 180 degree opposing spin angles $n_{down}$ and $n_{up}$ can be differentiated, that is $g_{up} - g_{down}$ should not equal 0. Additionally, $\alpha$ should be small enough that the approximation leading from equation (3) to equation (4) is reasonably accurate, i.e., the difference, $g_{up} - g_{down}$, can reasonably be assumed to be the derivative of the sinogram vector in the direction of the z-axis.

Next, g'(z), i.e., the derivative of g(z), is evaluated. Optionally, g'(z) is evaluated using the following relationship:

$$g'(z+0.5) \approx g(z+1) - g(z) \quad (6).$$

Finally, the 3D image can then be reconstructed by backprojecting g'(z). In a preferred embodiment, at each SPECT-view, g'(z) is backprojected two-dimensionally to form a 2D intermediate "projection" image $P_\Theta$, where $\Theta$ is the index representing the SPECT-angle of the 2D intermediate projection image P. Optionally, each backprojection of g'(z) is weighted by a $\sin(\beta)$ function, where $\beta$ is the relative angle between the axis 70 (i.e., the SPECT-axis) and the spin angles at which the respective g'(z) is evaluated. This reduces undesirable oversampling which would otherwise occur when the rotating z-axis of the radiation receiving face 23 of the detector head 22 is near parallel with the SPECT-axis. When indexing the face 23 about the axis 109, the $\sin(\beta)$ weighting may be accomplished by progressively increasing the sampling angle as the z-axis nears parallel with the SPECT-axis. Alternately, when continuously rotating the face 23 about the axis 109, the $\sin(\beta)$ weighting may be achieved by progressively reducing the acquisition time as the z-axis nears parallel with the SPECT-axis.

In any event, each $P_\Theta$ is preferably treated as 2D parallel-beam projection data at the SPECT-angle $\Theta$. Accordingly, $P_\Theta$ may in turn be backprojected two-dimensionally slice-by-slice. Thereafter, to obtain the final 3D image volume, the 2D slices are stacked in order adjacent one another.

Figure 8:
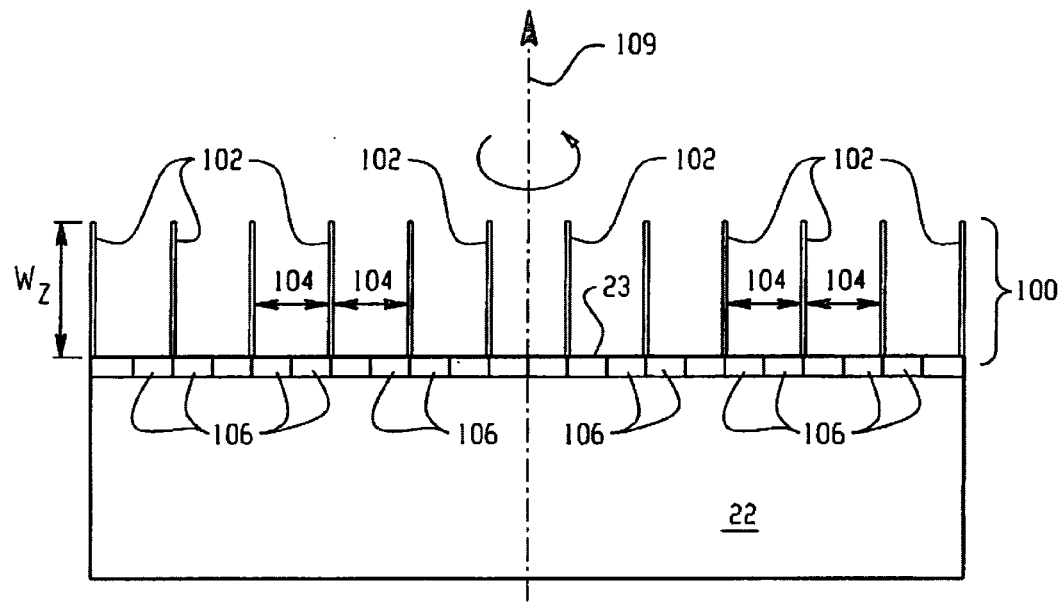
FIG. 8 is a diagrammatic illustration showing an exemplary embodiment of a sparse collimator in accordance with aspects of the present invention.

With reference to FIG. 8, another embodiment of the collimator 100 is illustrated. As shown, the slats 102 are substantially parallel to one another and substantially normal to the detector face 23. Additionally, every other slat 102 has been omitted, as compared to, e.g., the embodiment shown in FIG. 4. This type of collimator 100 and/or associated techniques used therewith are referred to herein as sparse, where the term "sparse" refers to the fact that there are less slats 102 than detector elements 106. Accordingly, in the sparse collimator, a plurality of detector elements 106 are situated between neighboring pairs of slats 102. As shown in FIG. 8, the sparse collimator 100 has 2 separately sampled detector elements 106 situated between adjacent slats 102.

As before, the collimator is arranged on the radiation receiving face 23 of the detector 22 so as to rotate about axis 109 with the detector 22 or the rotating portion 24 thereof (see also, e.g., FIG. 2B). Depending on a desired compromise between resolution and sensitivity, $W_z$ for the sparse collimator embodiment may be approximately 2–4 cm for higher sensitivity, around 4 cm for medium resolution, and around 6 cm for high resolution. The array of detector elements 106 extend in a first detector FOV direction (see also, e.g., FIG. 4) across the radiation receiving face 23 of the detector 22, with the slats 102 being spaced apart from one another in the same direction so multiple elements 106 are arranged between each pair of adjacent slats 102. The slats 102 extend in a second direction (i.e., their $W_y$ dimension (see also, e.g., FIG. 4)) substantially perpendicular to the array of elements 106, or the detector FOV direction.

Figures 9A, 9B:
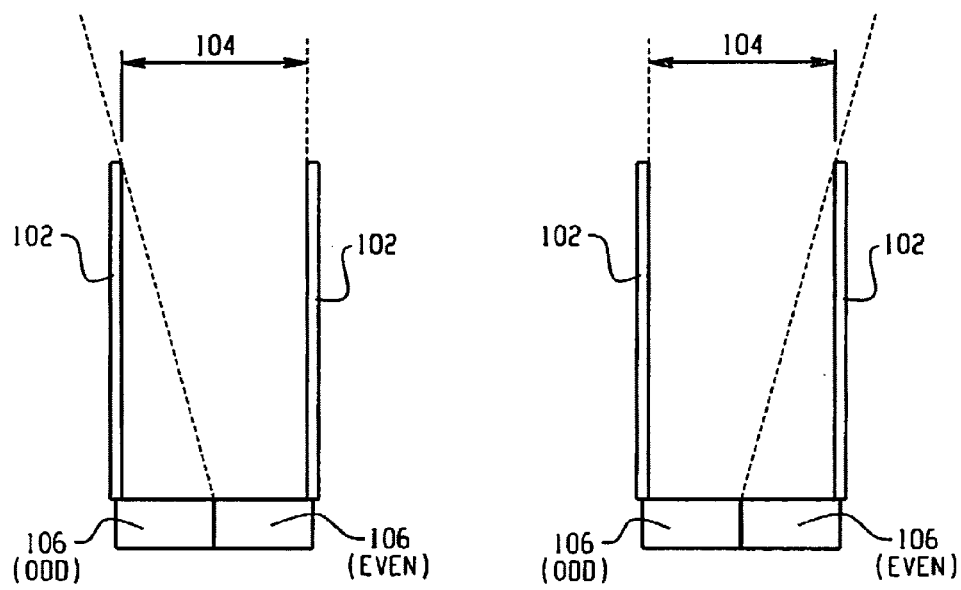
FIGS. 9A and 9B are diagrammatic illustrations depicting individual fields-of-view for a single pair of odd and even detector elements situated between neighboring collimator slats of the collimator shown in FIG. 8.

With reference to FIGS. 9A and 9B, each neighboring pair of slats 102 defines a gap 104 through which the elements 106 situated thereunder receive radiation. That is to say, the detector elements 106 arranged between neighboring slats 102 have angles of radiation acceptance or individual fields-of-view (as shown by the dashed lines) through gap 104 which are defined by their relative location with respect to the slats 102. Comparing FIGS. 9A and 9B shows that the element 106 depicted on the left (nominally termed herein the odd element or elements) has an individual FOV (see FIG. 9B) that sees more to the right than the element 106 depicted on the right (nominally termed herein the even element or elements), which has an individual FOV (see FIG. 9A) that sees more to the left. That is to say, due to their relative locations between the slats 102, the odd and even detector elements 106 experience different views. In the sparse collimator embodiment (see, e.g., FIG. 8), the asymmetry of these two views is used to simulate the small tilt angle $\alpha$ of the tilted slat collimator embodiment (see, e.g., FIG. 5A).

By subtracting the measurements or data obtained via the even detector elements 106 from the measurements or data obtained via the odd detector elements 106, essentially the same effect as produced by tilting the slats 102 is achieved. That is, this difference is used as an approximation of the first derivative of the Radon transform employed for image reconstruction. More specifically, at each SPECT-view, the detector 22 (or the rotating portion 24 thereof) is rotated along with the sparse collimator 100 for 180 degrees about axis 109. As the rotation is carried out or at indexed points within the rotation, the even detector elements 106 acquire measurements or data and the odd detector elements 106 likewise acquire measurements or data. For the same given rotational orientation about the axis 109, the measurements/data from each corresponding pair of detector elements 106 (one odd and even) situated between the same neighboring pair of slats 102 is subtracted from one another. The resulting difference (i.e., the result of the subtraction operation) is then used by the reconstruction processor 140 for the first derivative of the Radon transform. For example, the sinogram data from the even detector elements 106 obtained at a spin angle n is subtracted from the sinogram data from the odd detector elements 106 obtained at the same spin angle n; and, the resulting difference is used for the approximation of the first derivative of the Radon transform. The reconstruction then proceeds as described above.

Using a sparse collimator configuration, does offer certain advantages over a conventional ROLEC slat collimator configuration. For example, the relatively lower slat count results in a lighter and less costly construction. Also, compared to a tilted slat configuration, the normal slats of the sparse collimator can be easier to align. Additionally, the relatively larger slat spacing of the sparse collimator can enjoy a higher photon count. Further, using the sparse collimation technique, a complete SPECT-view data set can be collected with 180 degrees of rotation around axis 109, as compared to 360 degrees. Acquisition time benefits accordingly.

Figure 10:
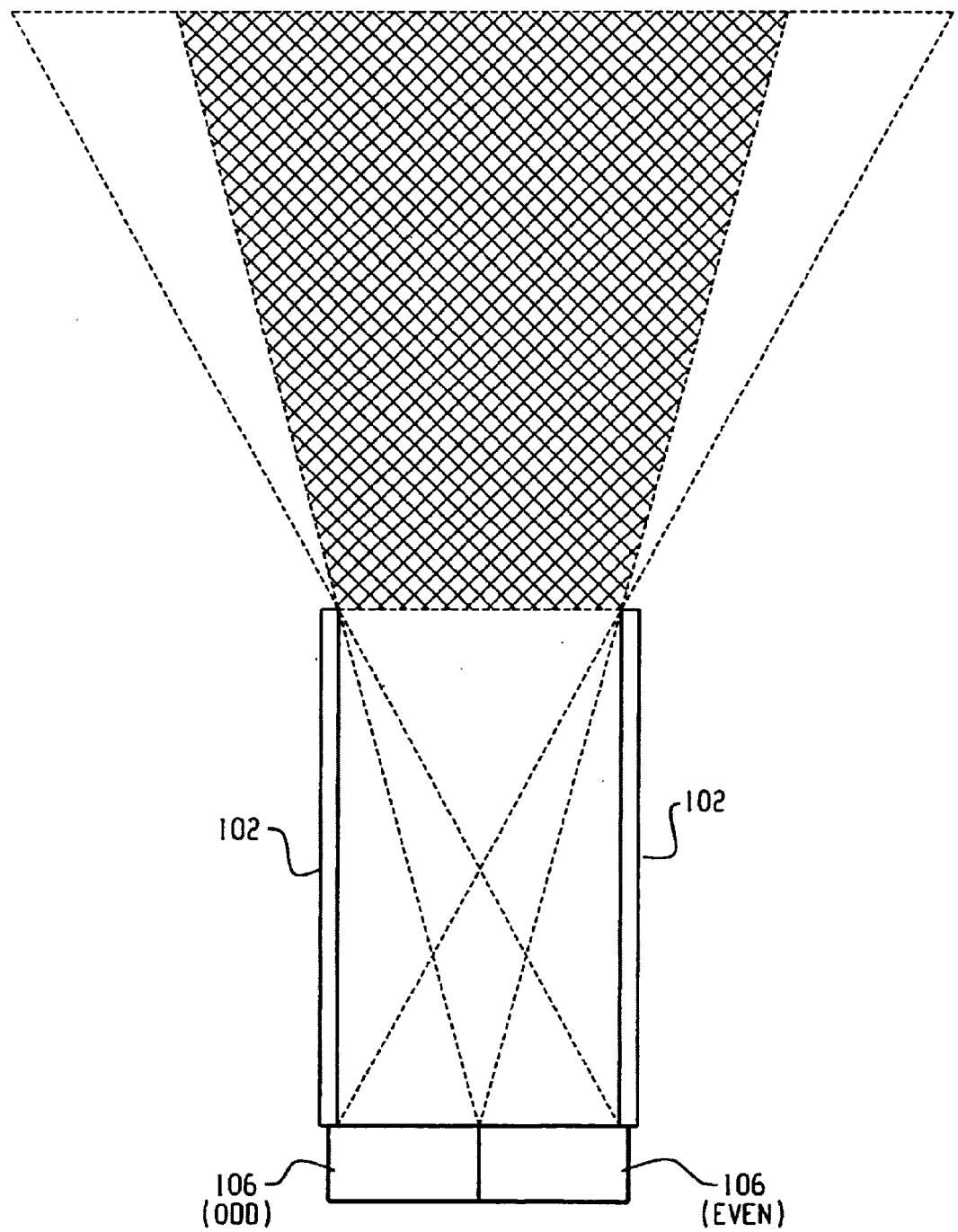
FIG. 10 is diagrammatic illustration showing an overlapping region in the individual fields-of-view for a single pair of odd and even detector elements situated between neighboring collimator slats of the collimator shown in FIG. 8.
Figure 11:
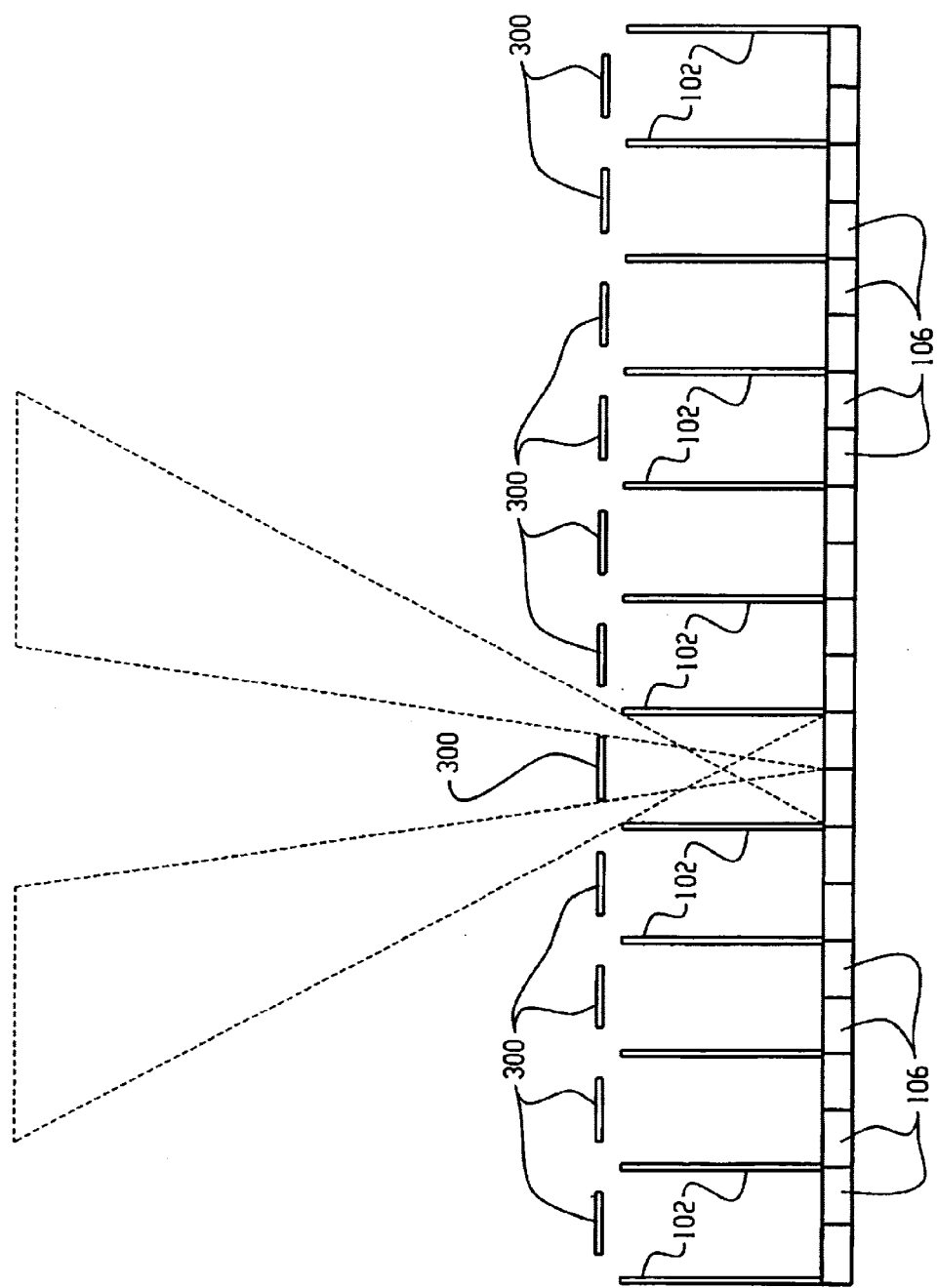
FIG. 11 is a diagrammatic illustration showing another exemplary embodiment of a sparse collimator in accordance with aspects of the present invention.

With reference to FIG. 10, in a sparse collimation scenario, an overlapping of the FOVs from odd and even detector elements 106 is shown in the cross-hatched region. As a result of the aforementioned subtraction, the measured contributions from radiation events in this overlapping region is essentially cancelled out. The double measurement of the overlapping region can be redundant and wasteful. Moreover, the noise contributions from the overlapping measurements are not exactly the same due to Poisson noise, and therefore, the noise introduced by these measurements may not entirely cancel out in the subtraction process. Accordingly, it is optional to filter out or physically block radiation acceptance from this region using stoppers 300 arranged in the sparse collimator as shown in FIG. 11. In this manner, noise that would otherwise be introduced from the measurements of the overlapping region is not realized by not acquiring the otherwise redundant data. The sacrifice is a lower total measured photon count as compared to not using the stoppers 300. The stoppers 300 are optionally fabricated from the same material as the slats 102.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A rotating laminar emission camera comprising:
   a detector which detects radiation, said detector having a radiation receiving side that faces an object being studied, and said detector including an array of detection elements, said array extending in a first direction across the radiation receiving side of the detector, said detection elements each detecting radiation incident thereon;
   a collimator constructed of a radiation attenuative material arranged on the radiation receiving side of the detector, said collimator experiencing relative rotation about an axis substantially normal to the radiation receiving side of the detector, said relative rotation being relative to the object being studied, and said collimator including a plurality of spaced apart slats each one extending in a second direction across the radiation receiving side of the detector, said slats being spaced apart from one another such that a plurality of the detector elements in the array of detector elements are arranged between adjacent pairs of slats.

2. The rotating laminar emission camera of claim 1, wherein two detector elements are arranged between adjacent pairs of slats.

3. The rotating laminar emission camera of claim 1, wherein the first and second directions are substantially normal to one another.

4. The rotating laminar emission camera of claim 1, wherein the slats are substantially normal to the radiation receiving side of the detector.

5. The rotating laminar emission camera of claim 1, wherein 2 cm $\leq W_z \leq$ 6 cm, where $W_z$ is a dimension of the slats measured in a direction z that is substantially normal to the radiation receiving side of the detector.

6. The rotating laminar emission camera of claim 1, wherein the collimator further includes:
   a plurality of stoppers made of radiation attenuative material, said stoppers being positioned between pairs of adjacent slats and between the radiation receiving side of the detector and the object being studied.

7. The rotating laminar emission camera of claim 1, wherein each stopper is arranged so as to obstruct overlapping regions in fields-of-views of underlying detector elements positioned between the same pair of adjacent slats.

8. The rotating laminar emission camera of claim 1, further comprising a drive which rotates at least one of the detector and the collimator about the axis.

9. The rotating laminar emission camera of claim 8, wherein the collimator and the detector are rotationally fixed about the axis with respect to one another.

10. A nuclear medical imaging apparatus comprising:
    a receiving region wherein an object being imaged is received;
    a radiation detector having an array of detector elements on a side which faces the receiving region, said side having an axis which is substantially normal thereto;
    a collimator fabricated from radiation attenuative material arranged on the detector between the detector and the receiving region, said collimator including a plurality of slats that have a spacing from one another such that in the direction of the spacing a plurality of detector elements are positioned between adjacent pairs of slats; and,
    a drive which imparts about the axis relative rotation between the collimator and the object being imaged.

11. The nuclear medical imaging apparatus according to claim 10, wherein a first detector element and a second detector element are positioned between each adjacent pair of slats, said first and second detector elements obtaining data at a plurality of instances in the relative rotation between the collimator and the object being imaged.

12. The nuclear medical imaging apparatus according to claim 10, further comprising:
    data processing means that subtracts the data obtained via the second detector element from the data obtained via the first detector element.

13. The nuclear medical imaging apparatus according to claim 12, wherein the data subtracted from one another corresponds to the same instance in the relative rotation between the collimator and the object being imaged.

14. A method of nuclear medical imaging comprising:
   (a) exposing a detector including an array of radiation detecting elements to an object being imaged;
   (b) restricting radiation acceptance for the detector such that different fields of view are established for elements in the array;
   (c) obtaining a first data set based on radiation detected via a first set of elements in the array;
   (d) obtaining a second data set based on radiation detected via a second set of elements in the array; and,
   (e) subtracting the second data set from the first data set to determine a difference between the first and second data sets.

15. The method of nuclear medical imaging according to claim 14, wherein the restricting is carried out such that the first set of elements have a first field of view and the second set of elements have a second field of view which is different from the first field of view.

16. The method of nuclear medical imaging according to claim 15, wherein the array is arranged such that elements from the first set alternate with elements from the second set.

17. The method of nuclear medical imaging according to claim 14, further comprising:
   (f) rotating the detector about an axis substantially normal to a side of the detector facing the object being imaged; and,
   (g) repeating steps (c) through (e) at a plurality of angular orientations of the detector as it rotates about the axis.

18. The method of nuclear medical imaging according to claim 17, further comprising:
   (h) reconstructing an image of the object being imaged using the determined differences of step (e) for 180 degrees of detector rotation.

19. A nuclear medical imaging apparatus comprising:
   means for exposing a detector including an array of radiation detecting elements to an object being imaged;
   means for restricting radiation acceptance for the detector such that different fields of view are established for elements in the array;
   means for obtaining a first data set based on radiation detected via a first set of elements in the array;
   means for obtaining a second data set based on radiation detected via a second set of elements in the array; and,
   means for subtracting the second data set from the first data set to determine a difference between the first and second data sets.

20. The nuclear medical imaging apparatus according to claim 19, further comprising:
   means for rotating the detector about an axis substantially normal to a side of the detector facing the object being imaged such that a plurality of differences between first and second data sets are determined at a plurality of angular orientations of the detector about the axis.

21. The nuclear medical imaging apparatus according to claim 20, further comprising:
   means for reconstructing an image of the object being imaged using the determined differences from 180 degrees of detector rotation.

* * * * *